United States Patent
Wiman et al.

(10) Patent No.: US 11,242,808 B2
(45) Date of Patent: Feb. 8, 2022

(54) METHOD AND ARRANGEMENT FOR DETERMINING EXHAUST MASS FLOW THROUGH A DIESEL PARTICULATE FILTER, AND FOR CONTROLLING ONE OR MORE ENGINE COMPONENTS AS A FUNCTION OF DETERMINED EXHAUST MASS FLOW

(71) Applicants: VOLVO TRUCK CORPORATION, Gothenburg (SE); Jan Wiman, Hagerstown, MD (US); Karl Tasik, Hagerstown, MD (US)

(72) Inventors: Jan Wiman, Hagerstown, MD (US); Karl Tasik, Hagerstown, MD (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/980,387

(22) PCT Filed: May 10, 2018

(86) PCT No.: PCT/US2018/032116
§ 371 (c)(1),
(2) Date: Sep. 12, 2020

(87) PCT Pub. No.: WO2019/216900
PCT Pub. Date: Nov. 14, 2019

(65) Prior Publication Data
US 2021/0087988 A1 Mar. 25, 2021

(51) Int. Cl.
*F02D 41/02* (2006.01)
*F01N 3/029* (2006.01)
(Continued)

(52) U.S. Cl.
CPC ......... *F02D 41/0235* (2013.01); *F01N 3/021* (2013.01); *F01N 3/0293* (2013.01);
(Continued)

(58) Field of Classification Search
CPC ............. F02D 41/0235; F02D 41/1448; F02D 41/029; F02D 41/1445; F02D 13/0215;
(Continued)

(56) References Cited

U.S. PATENT DOCUMENTS

| 7,157,919 B1 | 1/2007 | Walton |
| 9,399,185 B2 | 7/2016 | Bromberg et al. |

(Continued)

FOREIGN PATENT DOCUMENTS

| DE | 102015006232 A1 | 11/2016 |
| WO | 2015090342 A1 | 6/2015 |

OTHER PUBLICATIONS

International Search Report (dated Jul. 12, 2018) for corresponding International App. PCT/US2018/032116.
(Continued)

Primary Examiner — Audrey B. Walter
(74) Attorney, Agent, or Firm — WRB-IP LLP

(57) ABSTRACT

A method is provided for determining exhaust mass flow through a diesel particulate filter (DPF) in an engine arrangement including an engine and an exhaust after treatment system (EATS) comprising the DPF. The method comprises determining soot loading and soot distribution in the DPF, measuring pressure drop over the DPF, measuring pressure in the DPF, measuring temperature in the DPF, and determining exhaust mass flow through the DPF as a function of the measured pressure drop, the measured pressure, the measured temperature, and the soot loading and soot distribution. An arrangement is also provided for determining exhaust mass flow through a diesel particulate filter. A
(Continued)

method for controlling one or more engine components, and an engine, are also provided.

19 Claims, 4 Drawing Sheets

(51) Int. Cl.
| | |
|---|---|
| *F01N 3/08* | (2006.01) |
| *F01N 3/20* | (2006.01) |
| *F01N 9/00* | (2006.01) |
| *F02D 13/02* | (2006.01) |
| *F02D 13/04* | (2006.01) |
| *F02D 41/00* | (2006.01) |
| *F02D 41/38* | (2006.01) |
| *F02D 41/14* | (2006.01) |
| *F01N 3/021* | (2006.01) |

(52) U.S. Cl.
CPC ........... *F01N 3/0835* (2013.01); *F01N 3/208* (2013.01); *F01N 9/002* (2013.01); *F02D 13/0215* (2013.01); *F02D 13/04* (2013.01); *F02D 41/0002* (2013.01); *F02D 41/0072* (2013.01); *F02D 41/029* (2013.01); *F02D 41/1445* (2013.01); *F02D 41/1448* (2013.01); *F02D 41/38* (2013.01); *F01N 2560/08* (2013.01); *F01N 2560/12* (2013.01); *F01N 2610/03* (2013.01); *F01N 2900/1406* (2013.01); *F01N 2900/1411* (2013.01); *F01N 2900/1602* (2013.01); *F01N 2900/1606* (2013.01); *F02D 2041/389* (2013.01)

(58) Field of Classification Search
CPC .. F02D 13/04; F02D 41/0002; F02D 41/0072; F02D 41/38; F02D 2041/389; F01N 3/021; F01N 3/0293; F01N 3/0835; F01N 3/208; F01N 9/002; F01N 2560/12; F01N 2560/08; F01N 2900/1602; F01N 2610/03; F01N 2900/1406; F01N 2900/1411; F01N 2900/1606
See application file for complete search history.

(56) References Cited

U.S. PATENT DOCUMENTS

| | | | |
|---|---|---|---|
| 2003/0200746 A1* | 10/2003 | Saito | F01N 3/023 60/295 |
| 2005/0022519 A1* | 2/2005 | Shirakawa | F01N 9/002 60/297 |
| 2007/0022746 A1 | 2/2007 | Decou et al. | |
| 2010/0229538 A1 | 9/2010 | Bloms et al. | |
| 2012/0000184 A1 | 1/2012 | Ardanese et al. | |
| 2012/0053814 A1 | 3/2012 | George et al. | |
| 2013/0269323 A1 | 10/2013 | Oguri et al. | |
| 2015/0020504 A1 | 1/2015 | Nicole et al. | |
| 2015/0240696 A1* | 8/2015 | Saitou | F02D 41/222 73/114.76 |
| 2015/0355110 A1 | 12/2015 | Sappok et al. | |
| 2018/0340460 A1* | 11/2018 | Srinivasan | F01N 11/002 |
| 2020/0191079 A1* | 6/2020 | Schwaab | F02D 41/0235 |

OTHER PUBLICATIONS

European Search Report (dated Dec. 3, 2021) for corresponding European App. EP 18918000.3.

\* cited by examiner

METHOD AND ARRANGEMENT FOR DETERMINING EXHAUST MASS FLOW THROUGH A DIESEL PARTICULATE FILTER, AND FOR CONTROLLING ONE OR MORE ENGINE COMPONENTS AS A FUNCTION OF DETERMINED EXHAUST MASS FLOW

BACKGROUND AND SUMMARY

The present invention relates generally to methods and arrangements for determining exhaust mass flow through a diesel particulate filter (DPF) and, more particularly, to control of one or more engine components as a function of such determined exhaust mass flow.

A typical diesel engine arrangement includes an engine, intake and exhaust lines leading to and from the engine, respectively, an exhaust gas recirculation line extending between the intake and exhaust lines to permit some exhaust gas to be recirculated to upstream of the engine and to mix with fresh charge air, and an exhaust gas after treatment system (EATS) in the exhaust line. The EATS typically includes a DPF. Knowledge of exhaust mass or volume flow through the DPF is crucial for achieving, among other things, proper engine performance and emissions compliance, as well as for diagnostics of engine operation. It will be appreciated that exhaust mass flow and exhaust volume flow are related as exhaust mass flow is a function of exhaust volume flow, exhaust temperature, and exhaust pressure, and references to determining exhaust volume flow should be understood to also mean determining exhaust mass flow, and vice versa, except where otherwise indicated.

A standard technique for determining soot loading in a DPF involves measuring the pressure drop across the DPF. Determination of exhaust volume or mass flow through the DPF is also determined as a function of pressure drop across the DPF, temperature in the DPF, and pressure in the DPF. The inventors have recognized that these techniques are not particularly reliable. More particularly, the inventors have recognized that the pressure drop across a DPF is an unreliable indicator of soot loading or flow through the DPF, as soot distribution, i.e. the manner in which soot is loaded in the DPF, also plays an important role.

With respect to determination of exhaust volume or mass flow through the DPF, the inventors have recognized that the type of soot distribution in a DPF is an important parameter in correctly determining the volume flow or mass flow rate of exhaust gas through the DPF. While not wishing to be bound by theory, it is presently expected that lines corresponding to particular soot distributions at different soot loadings in a graphical representation of volume flow versus pressure drop across a DPF (dpDPF) in a given type of DPF will have the general shape shown in FIG. 1. Thus, for soot distributions in a DPF 10 that are primarily due to surface plugging of filter pores 12 with soot 14 such as is seen in FIG. 2, as soot loading increases from loading A to loading B to loading C (shown by dashed lines in FIG. 1), volume flow at a given dpDPF will decrease generally as illustrated in FIG. 1. Similarly, for soot distributions that are primarily due to soot loading on the substrate surface 16 of the pores 12 of the DPF 10 such as is seen in FIG. 3, as soot loading increases from loading A1 to loading B1 to loading C1 (shown by solid lines in FIG. 1), where A1, B1, and C1 are the same as A, B, and C, volume flow at a given dpDPF will decrease generally as illustrated in FIG. 1. In this illustration, if soot loading is due primarily to surface plugging, then there will tend to be a greater volume flow through the DPF at a given pressure drop for a given soot loading than if soot loading is due primarily to soot loading on the substrate surface of the DPF.

It is desirable to provide a more accurate technique for determine exhaust mass flow (or volume flow) through a DPF in an engine arrangement. It is also desirable to control one or more engine components as a function of more accurate exhaust mass flow determinations.

The inventors have recognized that, by determining the soot loading and the soot distribution in the DPF, it is possible to more accurately determine exhaust mass flow through the DPF. With this more accurate exhaust mass flow information, it is possible to properly control engine components as a function of this exhaust mass flow information, and thereby improve engine performance and emissions compliance, and more accurately diagnose engine operation.

In accordance with an aspect of the present invention, a method is provided for determining exhaust mass flow through a diesel particulate filter (DPF) in an engine arrangement comprising an engine and an exhaust after treatment system (EATS) comprising the DPF. The method comprises determining soot loading and soot distribution in the DPF, measuring pressure drop over the DPF, measuring pressure in the DPF, measuring temperature in the DPF, and determining exhaust mass flow through the DPF as a function of the measured pressure drop, the measured pressure, the measured temperature, and the soot loading and soot distribution.

In accordance with an aspect of the present invention, a method is provided for controlling an engine in an engine arrangement comprising the engine and an exhaust after treatment system (EATS) comprising a diesel particulate filter (DPF). The method comprises determining exhaust mass flow through the DPF by determining soot loading and soot distribution in the DPF, measuring pressure drop over the DPF, measuring pressure in the DPF, measuring temperature in the DPF, and determining exhaust mass flow through the DPF as a function of the measured pressure drop, the measured pressure, the measured temperature, and the soot loading and soot distribution. The method further comprises controlling one or more engine components as a function of the determined exhaust mass flow.

In accordance with another aspect of the present invention, an arrangement is provided for determining exhaust mass flow through a diesel particulate filter (DPF) in an engine arrangement comprising an engine and an exhaust after treatment system (EATS) comprising the DPF. The arrangement comprises means for determining soot loading and soot distribution in the DPF, means for measuring pressure drop over the DPF, means for measuring pressure in the DPF, means for measuring temperature in the DPF, and processing circuitry configured to determine exhaust mass flow through the DPF as a function of the measured pressure drop, the measured pressure, the measured temperature, and the soot loading and soot distribution.

In accordance with another aspect of the present invention, an engine arrangement, comprises an engine, an exhaust after treatment system (EATS) in an exhaust line of the engine, the EATS comprising a diesel particulate filter (DPF), and an arrangement for determining exhaust gas flow through the DPF, the exhaust gas flow measuring arrangement comprising means for determining soot loading and soot distribution in the DPF, means for measuring pressure drop over the DPF, means for measuring pressure in the DPF, means for measuring temperature in the DPF, and processing circuitry configured to determine exhaust mass flow through the DPF as a function of the measured pressure drop, the measured pressure, the measured temperature, and the soot loading and soot distribution. The processing circuitry is configured to control one or more engine components as a function of the determination of exhaust mass flow.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 4:
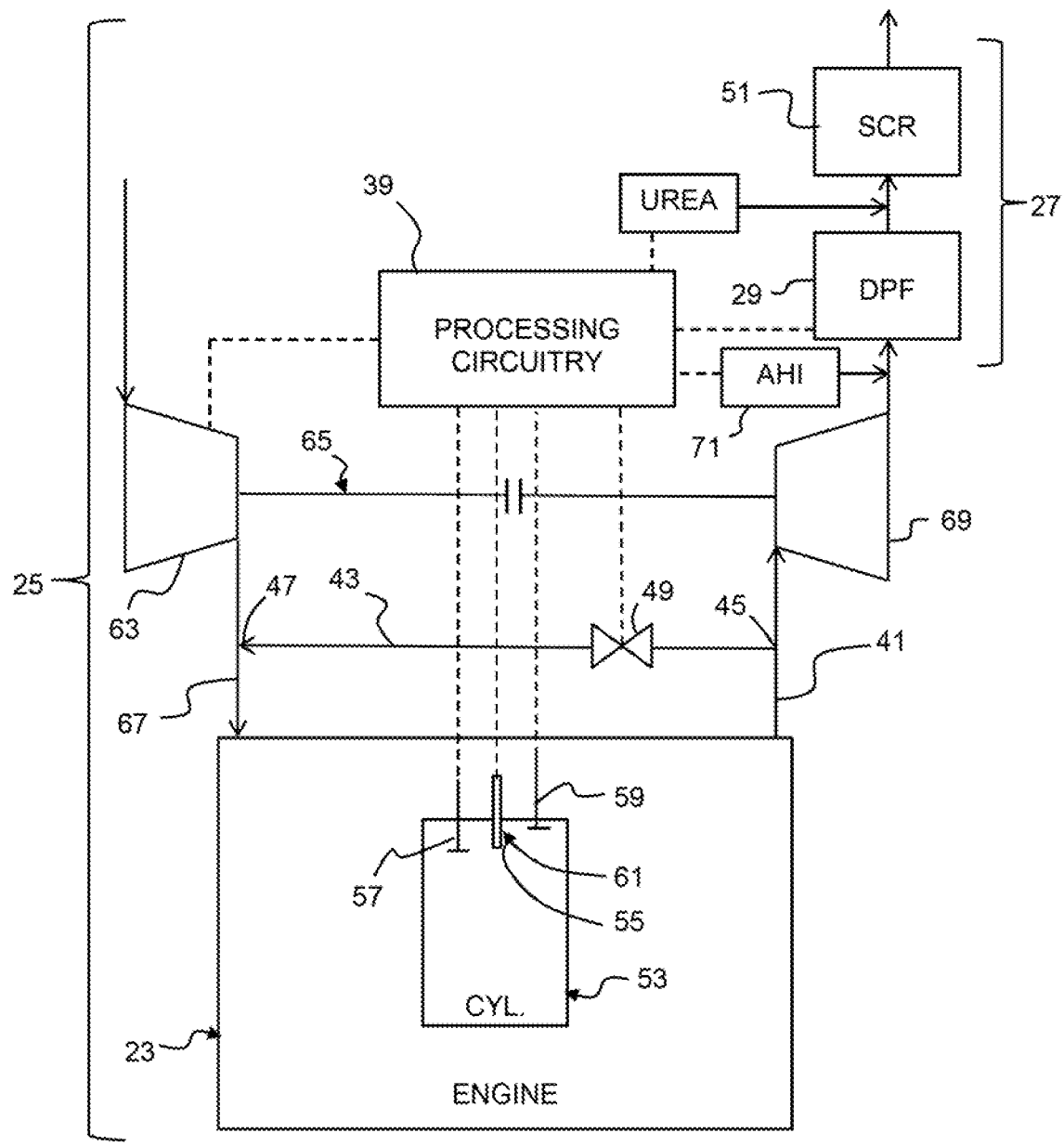
FIG. 4 schematically shows an engine arrangement according to an aspect of the invention.
Figure 5:
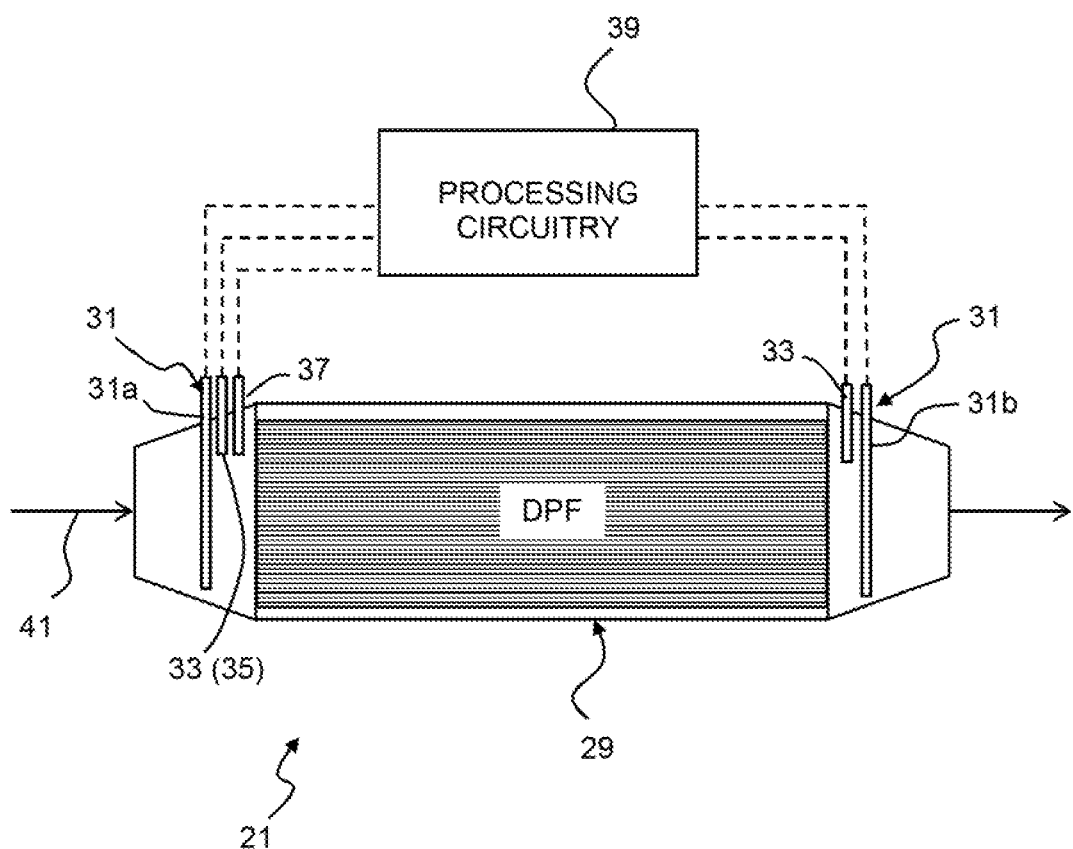
FIG. 5 schematically shows a soot loading and soot distribution determination arrangement according to an aspect of the invention.

An arrangement 21 for determining exhaust mass flow Mef through a diesel particulate filter 29 (DPF) in an engine arrangement 25 (FIG. 4) comprising an engine 23 and an exhaust after treatment system 27 (EATS) comprising the diesel particulate filter 29 (DPF) is shown in FIG. 5.

The arrangement 21 can comprise means 31 for determining soot loading and soot distribution in the DPF, means 33 for measuring pressure drop dpDPF over the DPF, means 35 for measuring pressure PDPF in the DPF, means 37 for measuring temperature TDPF in the DPF, and processing circuitry 39 configured to determine exhaust mass flow through the DPF as a function of the measured pressure drop, the measured pressure, the measured temperature, and the soot loading and soot distribution.

While soot loading and soot distribution may be determined by different means, a presently preferred means 31 for determining soot loading and soot distribution in the DPF 29 can comprise, but is not limited to, an RF sensor arrangement that is configured to sense a "difference" in microwave spectrum signal between a transmitted microwave signal and the received reflected microwave signal. RF sensors suitable for use in connection with the present invention are manufactured by CTS Corp. https://www.ctscorp.com/products/sensors-2/rf-dpf-sensor/ Other non-destructive techniques that can establish soot loading and soot distribution in real time in a DPF, such as via X-rays or ultrasound, such that that information can be related in real time to exhaust mass flow through the DPF can also or alternatively be used.

With the RF sensor arrangement, the signals can be transmitted from and received by one and the same antenna unit (i.e. a first antenna unit). If more than one antenna is installed, differences in microwave spectrum signal between the transmitted microwave signal from a first antenna unit 31a and a received microwave signal received by a second (or third) antenna unit 31b can be detected. By using processing circuitry, any one of these differences can be translated to the degree of soot loading and soot distribution in the DPF 29 by a predetermined algorithm. Microwaves are a form of electromagnetic radiation with wavelengths ranging from as long as one meter to as short as one millimeter, or equivalently, with frequencies between 300 MHz (0.3 GHz) and 300 GHz. Radio frequency (RF) is a rate of oscillation in the range of about 3 kHz to 300 GHz.

In an RF sensor arrangement for use in connection with the present invention, the signal transmitted from an antenna unit is typically within a bandwidth having a predetermined radio frequency. Alternatively, a plurality of signals may be transmitted by the antenna unit having different predetermined frequencies. By knowing the radio frequency of the transmitted signal, it becomes possible to determine a difference between the transmitted signal and the received reflected signal, or the received signal. This analysis is typically carried out by the processing circuitry.

The "difference" between transmitted signals and received reflected signals or received signals may correspond to a difference in pulse, a difference in amplitude and/or difference in spectrum energy. Alternatively, the difference may correspond to a difference in attenuation. More specifically, the "difference" may refer to a difference between the magnitude of the amplitude of the transmitted microwave and the magnitude of the amplitude of the received reflected microwave. Analogously, the "difference" may refer to a difference between the magnitude of the amplitude of the transmitted microwave and the magnitude of the amplitude of the received microwave. Analogously, the "difference" may refer to a difference between the pulse of the transmitted microwave and the pulse of the received reflected microwave, or the received microwave. For instance, a predetermined point, such as a valley or peak, of a pulse of the transmitted signal is compared with the location of the predetermined point of a pulse of the received reflected signal. Analogously, a predetermined point, such as a valley or peak, of a pulse of the transmitted signal is compared with the location of the predetermined point of a pulse of the received signal. That is, the change in pulse is determined between the transmitted signal and the received reflected signal, or received signal. Accordingly, by analyzing the amplitude, attenuation and/or phase changes at a given frequency or preferably at multiple frequencies, it becomes possible to determine a difference between the received microwave and the transmitted microwave.

The processing circuitry 39 and the term "processing circuitry" may refer to a control unit and/or may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital, signal processor mentioned above, the processor may further include computer executable code that controls operation of the programmable device.

Typically, the processing circuitry may determine the difference based on a spectral analysis of the received RF signal by analyzing the amplitude and/or phase at different frequencies. By detecting changes in the amplitude and/or phase at selected frequencies, the processing circuitry is capable of comparing the transmitted signal with the received signal. In the case of a sweeping frequency signal, the processing circuitry can utilize all or a portion of the frequencies in the swept range for the purpose of performing the signal analysis. In the case of a composite RF signal with larger bandwidth, the processing circuitry may be connected to a set of one or more filters, such as bandpass filters, for filtering out interesting portions of the received composite RF signal and use these frequency portions in the spectrum analysis.

The difference can be determined based on a comparison of a current spectrum value (amplitude/phase at one or more frequencies or ratio of amplitude/phase at multiple frequencies) of the received signal and a previously determined spectrum value of the transmitted signal. The previously determined spectrum value of the transmitted signal can be based on a spectrum analysis at a previous time instance.

By analysis of the difference(s) between one or more transmitted signals and one or more received signals, parameters for the soot loading and distribution in the DPF can be established that can be used in an algorithm to accurately determine exhaust mass flow wherein:

$$dpDPF = f(\text{Volume flow, PDPF, TDPF, soot load, soot distribution}), \quad (1)$$

$$\text{Volume flow} = f(dpDPF, PDPF, TDPF, \text{soot load, soot distribution}), \text{ and} \quad (2)$$

$$Mef = f(\text{Volume flow, PDPF, TDPF}) \quad (3)$$

where
dpDPF=pressure drop across DPF
Volume flow=volume of exhaust gas flow through DPF
PDPF—pressure of DPF
TDPF=temperature of DPF
soot load=soot load of DPF
soot distribution=soot distribution in DPF—a parameter that characterizes the location and type of soot loading
Mef=exhaust mass flow through DPF PDPF and TDPF may be determined in multiple ways, but are typically determined by averages of pressures and temperatures at various locations in the DPF, and may simply be pressure and temperature at a single location, such as at the inlet of the DPF.

Figure 1:
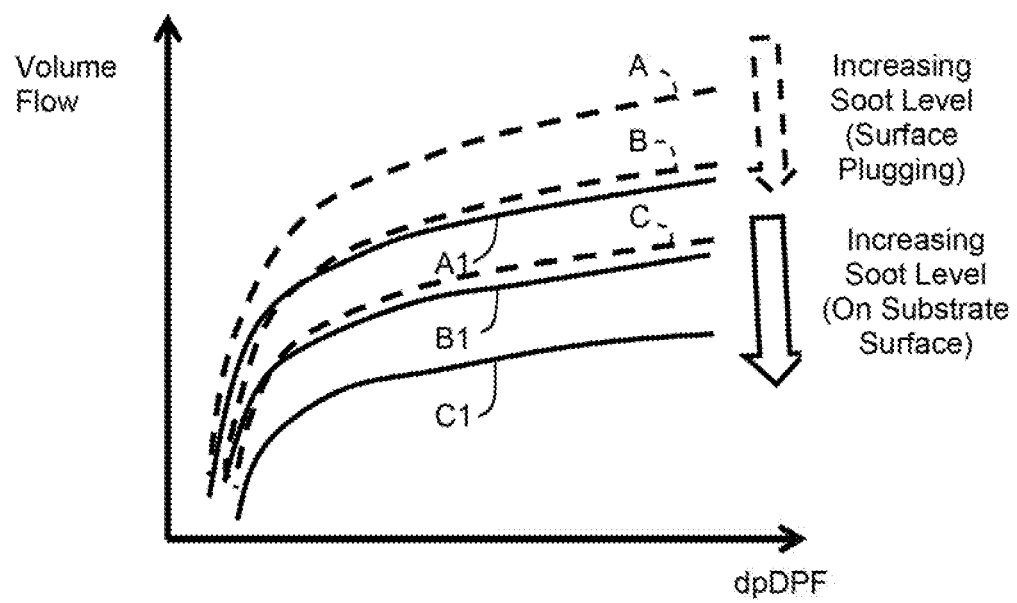
FIG. 1 is a graph showing volume flow through a DPF versus pressure drop across the DPF at different soot loadings and at different soot distributions.
Figure 2:
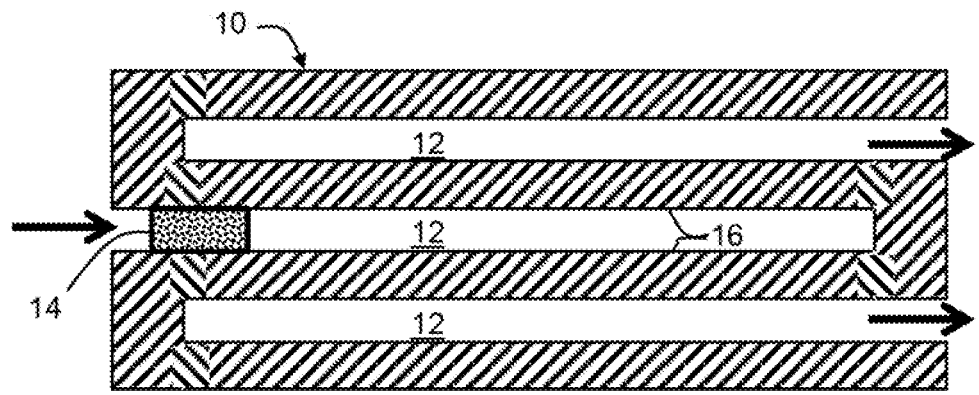
FIG. 2 schematically shows part of a DPF with surface plugging of a pore.
Figure 3:
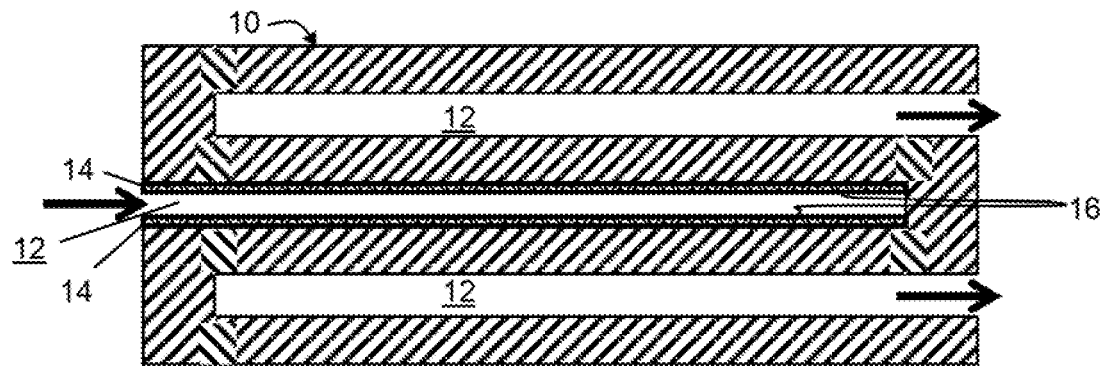
FIG. 3 schematically shows part of a DPF with soot loading on a substrate surface of a pore.

The parameters for soot loading and soot distribution in the DPF will ordinarily be established empirically for particular types of DPF based on extensive test data at different DPF temperatures and pressure drops across the DPF in conjunction with different signal data corresponding to particular levels of soot loading and types of soot distribution. Thus by analysis of signal data for a given DPF of the same type, it will be possible to determine parameters for soot loading and to determine whether soot loading is due to surface plugging of filter pores, due to accumulation of soot along the surfaces of the filter pores, or due to some combination of both, for that DPF and to thereby determine exhaust mass flow through that DPF. It is presently expected that, ordinarily, for most DPF types, the general shape of a graph of Volume flow versus dpDPF will be as illustrated in FIG. 1 at different loadings for different types of soot distributions. While it is presently anticipated that soot distributions in a DPF will ordinarily be mostly one or the other type of distribution (surface plugging or substrate surface loading), it will be appreciated that there will be circumstances where loading is a combination of both types of distribution.

The means 33 for measuring pressure drop dpDPF over the DPF 29 can be any suitable means, such as pressure sensors disposed at the inlet and outlet of the DPF that can send signals to the processing Circuitry to determine the difference in pressure between the two sensors.

The means 35 for measuring pressure PDPF in the DPF 29 can be any suitable means, such as plural pressure sensors disposed at several points along the DPF that send signals to the processing circuitry that then determines an average of pressure in the DPF, or a single pressure sensor that senses pressure at a single location, such as at the inlet of the DPF. As seen by indicating the reference number 35 in parentheses, the means for measuring pressure PDPF in the DPF 29 can be in the form of one or more of the sensors used to measure pressure drop over the DPF.

Similar to the means 35 for measuring pressure PDPF in the DPF 29, the means 37 for measuring temperature TDPF in the DPF can be any suitable means, such as plural temperature sensors disposed at several points along the DPF that send signals to the processing circuitry that then determines an average of temperature in the DPF, or a single temperature sensor that senses temperature at a single location, such as at the inlet of the DPF.

The engine arrangement 25 according to an aspect of the present invention is seen in FIG. 4 and comprises the engine 23, the EATS 27 in an exhaust line 41 of the engine, the EATS comprising the DPF 29, and the arrangement 21 for determining exhaust gas mass flow through the DPF. The exhaust gas flow mass determining arrangement 21 comprises the means 31 for determining soot loading and soot distribution in a DPF, the means 33 for measuring pressure drop over the DPF, the means 35 for measuring pressure in the DPF, the means 37 for measuring temperature in the DPF, and the processing circuitry 39 configured to determine exhaust mass flow through the DPF as a function of the measured pressure drop, the measured pressure, the measured temperature, and the soot loading and soot distribution. In addition, the processing circuitry 39 is configured to control one or more engine components as a function of the determination of exhaust mass flow through the DPF.

In an aspect of the invention, the processing circuitry 39 is configured to control flow through an exhaust gas recirculation (EGR) line 43 from a point 45 in the exhaust line 41 downstream of the engine 23 to a point 47 in an intake line 67 upstream of the engine as a function of the determined exhaust mass flow. The EGR line 43 includes an EGR valve 49 that is controllable by the processing circuitry 39 to control EGR flow through the EGR line as a function of the determined exhaust mass flow. When there is no EGR flow in the EGR line 43, i.e. the EGR valve 49 is completely closed, then:

$$Mef = \text{Charge air mass flow} + \text{Fuel mass flow} \quad (4)$$

Charge air mass flow is equal to Fresh Air mass flow plus EGR mass flow and, in Equation (4), EGR mass flow is zero. When there is EGR flow, the EGR mass flow can be calculated according to the following equation:

$$\text{EGR mass flow} = \text{Charge Air mass flow} + \text{Fuel mass flow} - Mef \quad (5)$$

If there is no EGR, the Charge Air mass flow equals the Fresh Air mass flow, which can be determined by, e.g., a hot wire air mass flow meter. If there is EGR (and if there is not EGR), the Charge Air mass flow can be determined as:

$$\text{Charge Air mass flow} = f(\text{Pinlet, Tinlet, volumetric efficiency model}) + \text{Fuel mass flow} \quad (6)$$

where Pinlet and Tinlet are pressure and temperature at the inlet manifold of the engine. Determination of EGR mass flow in this fashion permits the EGR system to be simplified in that the need for flow measuring equipment can be avoided. Alternatively, this means of EGR mass flow determination can be a backup to conventional flow measuring equipment such as venturis, or vice versa. When EGR mass flow is accurately known, then EGR flow can be controlled, such as by controlling, via processing circuitry, the EGR valve 49 in the EGR line 43 to achieve desired effects, such as improved combustion, improved emissions, and desired power levels.

In a further aspect of the invention, the processing circuitry 39 is configured to control dosing of a reductant such as urea into an exhaust gas stream entering a selective catalytic reduction catalyst 51 (SCR) in the EATS 27 as a function of the determined exhaust mass flow, such as by control of a pump for urea. By determining exhaust mass flow according to the present invention, inaccuracies in conventional techniques for determining exhaust mass flow, such as determinations based on pressure drop across the DPF 29 alone, can be avoided or minimized, and over dosing or under dosing of the exhaust gas stream can be avoided.

In a further aspect of the invention, the processing circuitry 39 is configured to control airflow through the engine 23 during engine braking to maintain temperature of engine components below a predetermined temperature as a function of the determined exhaust mass flow. For example, during engine braking, even though no combustion occurs in an engine cylinder 53, compression of air in the cylinder causes high temperatures to develop. During normal engine operation, the fuel injector heads 55 are cooled by fuel passing through them. During engine braking, no fuel is injected into the cylinder and high temperatures can occur at the injector heads, which can cause damage. By more accurately measuring the exhaust mass flow according to the present invention, it is possible to ensure that sufficient air passes through the cylinders to keep components such as injector heads 55 within desired temperature ranges, such as by control of the speed of a compressor 63 and/or vane angles of a variable geometry turbocharger 65.

In a further aspect of the invention, the processing circuitry 39 is configured to control timing of opening and closing of at least one of cylinder intake valves 57 and cylinder exhaust valves 59 of the engine as a function of the determined exhaust mass flow. The intake valves 57 and exhaust valves 59 can be operated in any conventional manner, such as by electronic reciprocation of the valves via, e.g., a solenoid (not shown). At the same time as, or independently of, control of timing of opening and closing of at least one of cylinder intake valves 57 and cylinder exhaust valves 59 of the engine 23 as a function of the determined exhaust mass flow, the processing circuitry 39 can be configured to control fuel injection via fuel injectors 61 into cylinders 53 of the engine as a function of the determined exhaust mass flow. The fuel injectors 61 can be controlled to inject fuel in any suitable conventional manner, such as by electronic actuation of the injectors. Accurate, real-time knowledge of exhaust mass flow, EGR flow, and charge air mass flow facilitates controlling valve timing and fuel injection timing to optimize fuel economy and power generation, and to control emissions. If exhaust mass flow is not correctly determined and not determined in substantially real time, then the charge air mass flow may be provided at a less than optimal rate, and the EGR determination may be inaccurate. If changes to valve timing or fuel injection are made based on incorrect data, whether to optimize fuel consumption or power generation, or to control emissions, they will often fail to achieve desired results.

In a further aspect of the invention, the processing circuitry 39 is configured to control fresh air intake into the engine as a function of the determined exhaust mass flow. With accurate, substantially real-time knowledge of exhaust mass flow, a compressor 63, such as the compressor of a turbocharger 65, can be controlled to introduce a desired amount of fresh air to achieve desired combustion effects, including optimal fuel efficiency and power generation, and to achieve desired emissions effects, such as by control of the speed of a compressor 63 and/or vane angles of a variable geometry turbocharger 65. For example, if exhaust mass flow is determined to be "X" according to the present invention, if it is desired to generate more power or achieve more complete combustion, the amount of fresh air intake can be increased until exhaust mass flow is "X'" (where X'>X).

It will be appreciated that the engine arrangement 25 and EATS 27 described herein are not limited to the illustrated embodiments. For example, the engine arrangement 25 will typically include multiple cylinders 53 connected to intake and exhaust manifolds (not shown) between the intake line 67 and the cylinders 53 and between the exhaust line 41 and the cylinders, respectively, and the EATS 27 will often include additional components, such as a diesel oxidation catalyst, typically in the exhaust line 41 upstream of the DPF 29 and downstream of a turbocharger turbine 69.

Figure 6:
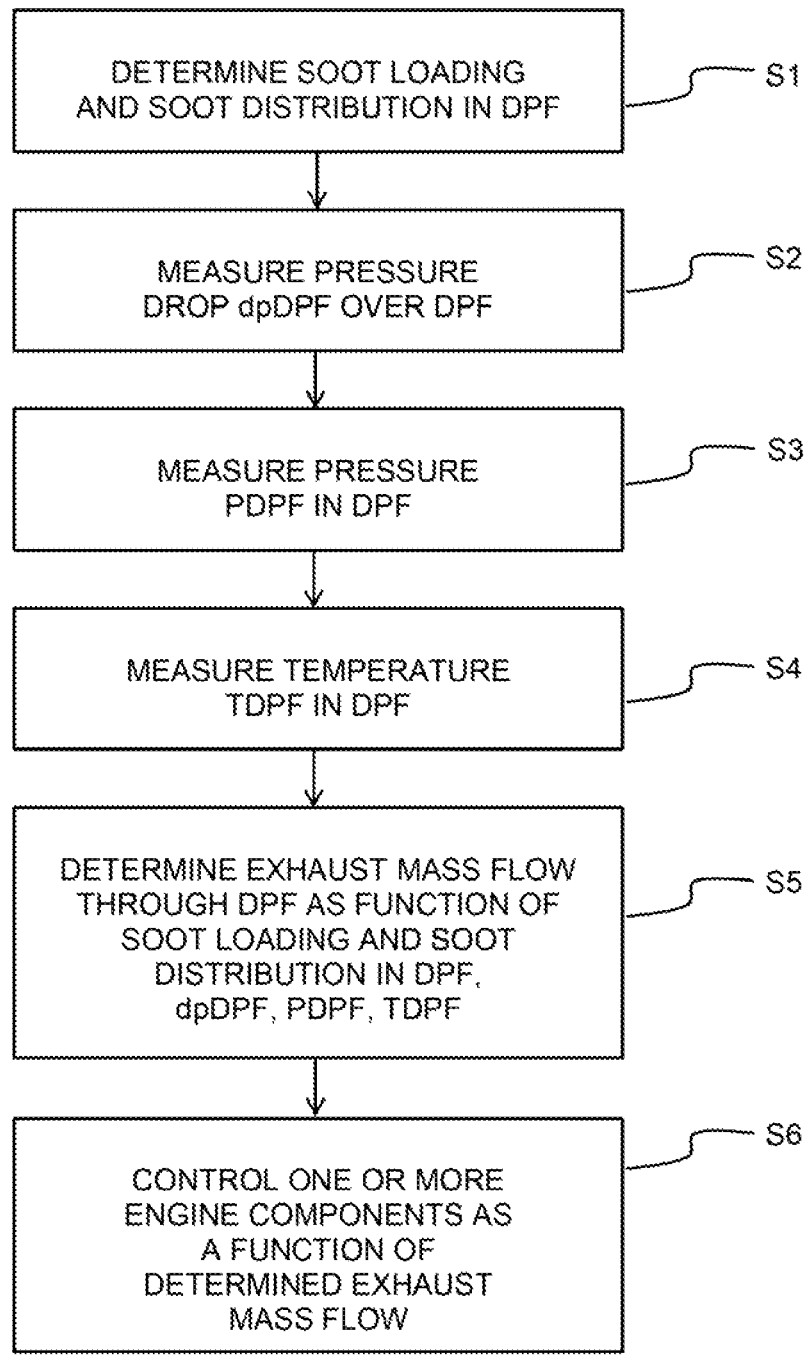
FIG. 6 is a flow chart showing steps in a method for controlling one or more engine components as a function of determined exhaust mass flow.

FIG. 6 is a flow chart showing steps in a method for controlling the engine 23 in the engine arrangement 25 comprising the engine and the EATS 27 comprising the DPF 29. In step S1, soot loading and soot distribution is determined in the DPF by a suitable means 31 for determining soot loading and soot distribution such as an RF sensor associated with processing circuitry 39. Pressure drop dpDPF is measured over the DPF in step S2 by suitable means 33 for measuring pressure drop such as pressure sensors at the inlet and outlet of the DPF. Pressure P in the DPF is measured in step S3 by suitable means 35 for measuring pressure (which may be part of the means 33 for measuring pressure drop) such as pressure sensors at one or more locations in the DPF. Temperature in the DPF 29 is measured in step S4 by suitable means 37 for measuring temperature such as a temperature sensor. Exhaust mass flow through the DPF is then determined in step S5 as a function of the measured pressure drop, the measured pressure, the measured temperature, and the soot loading and soot distribution.

In step S6, one or more engine components is controlled as a function of the exhaust mass flow determined in step S5. The step of controlling one or more engine components can comprise one or more of:

controlling flow through an exhaust gas recirculation line from a point downstream of the engine to a point upstream of the engine as a function of the determined exhaust mass flow, such as by controlling opening and closing of the EGR valve 49;

controlling dosing of a reductant into an exhaust gas stream entering a selective catalytic reduction catalyst (SCR) in the EATS as a function of the determined exhaust mass flow, such as by control of a pump for dosing urea;

controlling injecting of hydrocarbon via an Aftertreatment Hydrocarbon Injection (AHI) arrangement 71 (FIG. 4) into exhaust gas for active regeneration of a DPF as a function of the determine exhaust mass flow;

controlling airflow through the engine during engine braking to maintain temperature of engine components below a predetermined temperature as a function of the determined exhaust mass flow, such as by control of the speed of a compressor 63 or vane angles of a variable geometry turbocharger 65;

controlling timing of opening and closing of at least one of cylinder intake valves 57 and cylinder exhaust valves 59 of the engine as a function of the determined exhaust mass flow;

controlling fuel injection into cylinders by fuel injectors 61 of the engine as a function of the determined exhaust mass flow; and controlling fresh air intake into the engine as a function of the determined exhaust mass flow, such as by control of the speed of a compressor 63 and/or vane angles of a variable geometry turbocharger 65.

The foregoing list is not intended to be limiting and the step of controlling one or more engine components can comprise controlling other components.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for controlling an engine in an engine arrangement comprising the engine and an exhaust after treatment system (EATS) comprising a diesel particulate filter (DPF), the method comprising:
   determining exhaust mass flow through the DPF by
      determining soot loading and soot distribution in the DPF,
      measuring pressure drop over the DPF,
      measuring pressure in the DPF,
      measuring temperature in the DPF, and
      determining exhaust mass flow through the DPF as a function of the measured pressure drop, the measured pressure, the measured temperature, and the soot loading and soot distribution; and
   controlling one or more engine components as a function of the determined exhaust mass flow.

2. The method as set forth in claim 1, wherein the step of controlling one or more engine components comprises controlling flow through an exhaust gas recirculation line from a point downstream of the engine to a point upstream of the engine as a function of the determined exhaust mass flow.

3. The method as set forth in claim 1, wherein the step of controlling one or more engine components comprises controlling dosing of a reductant into an exhaust gas stream entering a selective catalytic reduction catalyst (SCR) in the EATS as a function of the determined exhaust mass flow.

4. The method as set forth in claim 1, wherein the step of controlling one or more engine components comprises controlling injecting of hydrocarbon via an aftertreatment hydrocarbon injection arrangement (AHI) into exhaust gas for active regeneration of a DPF as a function of the determined exhaust mass flow.

5. The method as set forth in claim 1, wherein the step of controlling one or more engine components comprises controlling airflow through the engine during engine braking to maintain temperature of engine components below a predetermined temperature as a function of the determined exhaust mass flow.

6. The method as set forth in claim 1, wherein the step of controlling one or more engine components comprises controlling timing of opening and closing of at least one of cylinder intake valves and cylinder exhaust valves of the engine as a function of the determined exhaust mass flow.

7. The method as set forth in claim 1, wherein the step of controlling one or more engine components comprises controlling fuel injection into cylinders of the engine as a function of the determined exhaust mass flow.

8. The method as set forth in claim 1, wherein the step of controlling one or more engine components comprises controlling fresh air intake into the engine as a function of the determined exhaust mass flow.

9. An arrangement for determining exhaust mass flow through a diesel particulate filter (DPF) in an engine arrangement comprising an engine and an exhaust after treatment system (EATS) comprising the DPF, the arrangement comprising:
   means for determining soot loading and soot distribution in the DPF;
   means for measuring pressure drop over the DPF;
   means for measuring pressure in the DPF;
   means for measuring temperature in the DPF; and
   processing circuitry configured to determine exhaust mass flow through the DPF as a function of the measured pressure drop, the measured pressure, the measured temperature, and the soot loading and soot distribution.

10. The arrangement as set forth in claim 9, wherein the means for determining soot loading in the DPF comprises a radio frequency (RF) sensor.

11. The arrangement as set forth in claim 10, wherein the means for determining soot distribution in the DPF comprises the RF sensor.

12. An engine arrangement, comprising:
   an engine;
   an exhaust after treatment system (EATS) in an exhaust line of the engine, the EATS comprising a diesel particulate filter (DPF); and
   an arrangement for determining exhaust gas flow through the DPF, the exhaust gas flow determining arrangement comprising
      means for determining soot loading and soot distribution in the DPF,
      means for measuring pressure drop over the DPF,
      means for measuring pressure in the DPF,
      means for measuring temperature in the DPF, and
      processing circuitry configured to determine exhaust mass flow through the DPF as a function of the measured pressure drop, the measured pressure, the measured temperature, and the soot loading and soot distribution,
   wherein the processing circuitry is configured to control one or more engine components as a function of the determination of exhaust mass flow.

13. The engine arrangement as set forth in claim 12, wherein the processing circuitry is configured to control flow through an exhaust gas recirculation line from a point downstream of the engine to a point upstream of the engine as a function of the determined exhaust mass flow.

14. The engine arrangement as se forth in claim 12, wherein the processing circuitry is configured to control dosing of a reductant into an exhaust gas stream entering a selective catalytic reduction catalyst (SCR) in the EATS as a function of the determined exhaust mass flow.

15. The engine arrangement as set forth in claim 12, wherein the processing circuitry is configured to control injecting of hydrocarbon via an aftertreatment hydrocarbon injection arrangement (AHI) into exhaust gas for active regeneration of a DPF as a function of the determined exhaust mass flow.

16. The engine arrangement as set forth in claim 12, wherein the processing circuitry is configured to control airflow through the engine during engine braking to maintain temperature of engine components below a predetermined temperature as a function of the determined exhaust mass flow.

17. The engine arrangement as set forth in claim 12, wherein the processing circuitry is configured to control timing of opening and closing of at least one of cylinder intake valves and cylinder exhaust valves of the engine as a function of the determined exhaust mass flow.

18. The engine arrangement as set forth in claim 12, wherein the processing circuitry is configured to control fuel injection into cylinders of the engine as a function of the determined exhaust mass flow.

19. The engine arrangement as se forth in claim 12, wherein the processing circuitry is configured to control fresh air intake into the engine as a function of the determined exhaust mass flow.

\* \* \* \* \*